United States Patent [19]

Hingst

[11] Patent Number: 4,750,338
[45] Date of Patent: Jun. 14, 1988

[54] DEVICE FOR COOLING A DETECTOR, PARTICULARLY IN AN OPTICAL SEEKER

[75] Inventor: Uwe Hingst, Oberteuringen, Fed. Rep. of Germany

[73] Assignee: Bodenseewerk Geratetchnik GmbH, Uberling, Fed. Rep. of Germany

[21] Appl. No.: 34,104

[22] Filed: Apr. 2, 1987

[30] Foreign Application Priority Data

Apr. 4, 1986 [DE] Fed. Rep. of Germany ....... 3611206

[51] Int. Cl.$^4$ ............................................. F25B 19/00
[52] U.S. Cl. .................................. 62/514 JT; 62/216
[58] Field of Search ..................... 62/3, 93, 94, 514 R, 62/514 JT, 216

[56] References Cited

U.S. PATENT DOCUMENTS

| 3,225,517 | 12/1965 | Wachsmith | 55/31 |
| 3,367,120 | 2/1968 | Franklin | 62/3 |
| 3,488,971 | 1/1970 | Meckler | 62/94 |
| 4,080,802 | 3/1978 | Annable | 62/514 JT |

OTHER PUBLICATIONS

Kaltetechnik: 15th Yr., No. 5 (1963), pp. 137–143.
"Linde-Berichte Aus Technik und Wissenschaft," No. 57 (1985), pp. 48–51.
Ullmanns Enzykopadie der Technischen Chemie, vol. 2 (1972), p. 610.

Primary Examiner—Ronald C. Capossela
Attorney, Agent, or Firm—Lee & Smith

[57] ABSTRACT

A detector (24) in an optical seeker is cooled by means of the Joule-Thomson effect by expansion of pressurized gas. The pressurized gas is generated by a compressor (10) and is guided through a molecular filter (18) to the cooling device (22). The molecular filter (18) adsorbs disturbing components of the pressurized gas. In order to regenerate the molecular filter (18) a gas flow is periodically guided in opposite direction from a storage vessel (30) through the molecular filter (18) to an outlet. In normal operation the molecular filter (18) is cooled by Peltier elements (38). During the regeneration it is heated.

12 Claims, 3 Drawing Sheets

DEVICE FOR COOLING A DETECTOR, PARTICULARLY IN AN OPTICAL SEEKER

The invention relates to a device for cooling a detector, particularly in an optical seeker by means of the Joule-Thomson effect by expansion of pressurized gas, comprising (a) a compressor for taking in and compressing the gas in a pressurized gas conduit leading to the detector and (b) a molecular filter which is connected downstream of the compressor for adsorbing disturbing elements of the gas.

It is known to cool detectors for optical seekers in target-seeking missiles by using the Joule-Thomson effect. Thereby the signal-to-noise ratio of the detector is decisively improved particularly in the infrared range. The pressurized gas to be expanded is taken from a gas bottle. Because it is not only necessary to cool the detector in the moment of launching and during the target tracking in this way but the detector has to be kept cool during the whole mission of the missile carrier, the consumption of gas is rather high. Therefore the gas bottles regularly have to be replaced. If this is forgotten the seeker can become inoperative in a critical moment in that the gas supply becomes exhausted and the cooling of the detector ceases.

Therefore it has been suggested to use pressurized air as pressurized gas to be expanded for the Joule-Thomson effect, which compressed air is taken in and compressed by means of a compressor. This pressurized air is directed through a pressurized gas conduit to the detector and there is expanded, which results in cooling. A precooling of the pressurized air to be expanded occurs by heat exchange in a counterflow process such that extraordinary low temperatures are achieved thereby.

Then an exchange of gas bottles can be avoided. But another problem results: The gas in the gas bottles is pure. But the air taken in contains gaseous components which condense or freeze at comparatively high temperatures, for example water vapour or carbon dioxide. Such components of air would condense or freeze in the area of the cooled detector and thus make the cooling system inoperative within short time, for example by obstructing the pressurized gas conduit or the outlet nozzle through which the depressurizing of the pressurized air takes place.

Therefore it is necessary to remove the disturbing components in advance from the pressurized air. For this purpose it has been suggested to connect a molecular filter downstream of the compressor, which molecular filter adsorbs the disturbing components of the gas. But such a filter is saturated after a certain time, which depends on its surface and thus on its magnitude. In order to keep such a molecular filter operative over an extended period the molecular filter therefore has to be rather big. This is disadvantageous. A frequent change is necessary with small molecular filters.

Thereby the problem actually is only shifted: Instead of a change of the gas bottle now a change of the molecular filter is necessary. A neglect in this respect can also lead to inoperability of the seeker at the wrong time. When the molecular filter is saturated it does not adsorb the disturbing components any longer. Then those components can, as described, condense and freeze in the range of the cooled detector.

It is an object of the invention to form a device of the above defined type such that the necessity of exchange of parts is avoided.

A further, more specific object of the invention is to enable the use of a molecular filter as small as possible.

According to the invention this object is achieved in that (c) a storage vessel is connected to the pressurized gas conduit downstream of the molecular filter, (d) the pressurized gas conduit between compressor and molecular filter is arranged to be connected through a controlled valve to an outlet, (e) temperature controlling means are provided for varying the temperature of the molecular filter between a relatively low and a relatively high value, (f) a control device is provided, which is arranged
  to actuate the controlled valve to close and to switch the temperature controlling means over to the relatively low temperature in a first state and
  to actuate the controlled valve to open and to switch the temperature controlling means over to the relatively high temperature in a second state, and (g) the control device normally is in the first state and switches into the second state in time intervals.

During the normal operation the storage vessel is "charged", i.e. charged with pressurized gas under the pressure prevailing downstream of the molecular filter. In certain periods, which are determined by the control device, the pressurized gas conduit then is closed downstream of the connection of the storage vessel and at the same time an outlet is opened upstream of the molecular filter. Now gas flows out of the storage vessel backwards through the molecular filter to the outlet. While the adsorption at the molecular filter occurs at a low temperature as compared to the reverse flow temperature under high pressure, namely the output pressure of the compressor, a high temperature as compared to the normal operation temperature of the molecular filter and a low pressure, namely the outlet pressure are used. The low temperature and the high pressure promote the expelling of the adsorbed elements during the reverse flow. Consequently the amount of gas stored in the storage vessel is sufficient to remove the adsorbed elements again from the molecular filter and to make it operative for the normal cooling operation. This arrangement is adapted for continuous operation. No regular exchange of gas bottles or molecular filters is necessary as with the prior proposals. The molecular filter can be formed in spacesaving manner, because it is regenerated before saturation occurs.

Modifications of the invention are subject matter of the sub-claims.

An embodiment of the invention will now be described in greater detail with reference to the accompanying drawings.

Figure 1:
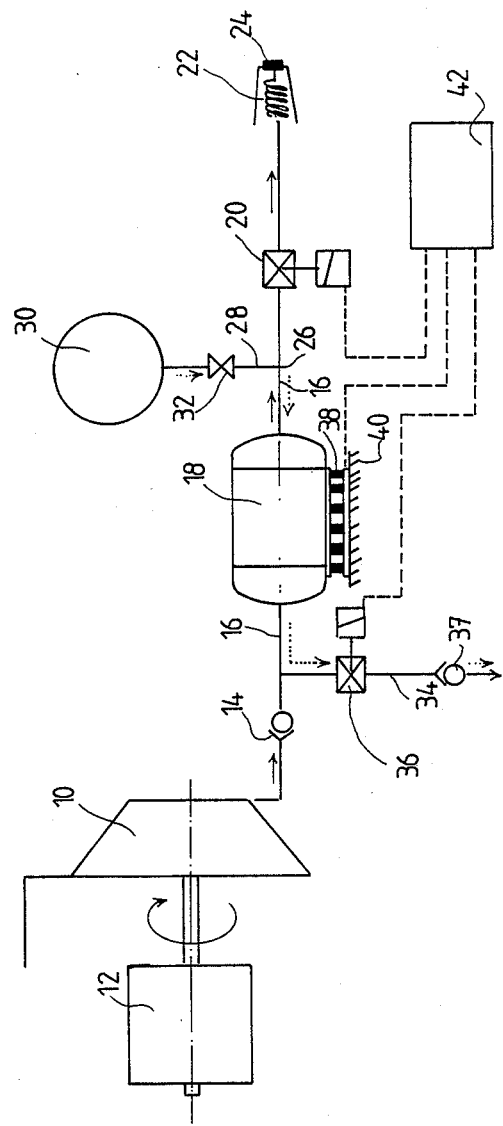
FIG. 1 is a schematic circuit diagram of a device for cooling a detector.

A compressor 10 is driven by a motor 12. The compressor 10 provides an output pressure which becomes effective through a check valve 14 in a pressurized gas conduit 16. A molecular filter 18 is connected downstream of the compressor 10 in the prssurized gas conduit 16. The molecular filter 18 can contain activated carbon, for example. One gramme activated carbon has a surface of about 500 m. Then the pressurized gas conduit leads through a controlled valve 20 to a cooling device 22 for a detector 24. The cooling device 22 uses the Joule-Thomson effect. The pressurized gas is expanded through a nozzle and thereby cools down. The cooled and expanded gas flows through a heat exchanger located in the pressurized gas conduit 16, such that the pressurized gas flowing in is pre-cooled. The cooling device 22 is known as such and therefore is not illustrated and described here in detail. Thereby very strong cooling of the detector 24 is achieved. At the low temperatures appearing thereby certain components of the air taken in freeze out and thus make the cooling device 22 inoperative. To avoid this such elements are removed by the molecular filter 18. Downstream of the molecular filter 18 a branch conduit 28 branches off at a port 26 of the pressurized gas conduit 16. The branch conduit 28 leads to a storage vessel 30. An adjustable restrictor 32 is arranged in the branch conduit. Upstream of the molecular filter 18 between the molecular filter 18 and the check valve 14 a branch conduit 34 branches off from the pressurized gas conduit 16. The branch conduit 34 comprises a controlled valve 36 and is connected through a check valve 37 opening in outlet direction to an outlet.

The molecular filter 18 is connected through temperature controlling means in form of Peltier elements 38 to a heat accumulator 40, i.e. a mass with rather high heat capacity. Preferably the housings of the compressor 10 and the motor 12 (or one of them) serve as heat accumulator 40.

The controlled valves 20 and 36 and the Peltier elements 38 are controlled by a control device 42. In a first state, the controlled valve 36 is actuated to close, the controlled valve 20 is arranged to be actuated to open and the temperature controlling means can be switched over to the relatively low temperature by the control device 42, i.e. the Peltier elements 38 are flow through by current such that they take heat from the molecular filter 18 and supply heat to the heat accumulator 40. That is the normal operation of the device in which the cooling device 22 is in operation and the molecular filter 18 is kept at low temperature in order to adsorb as much as possible of the component of the compressed gas to be eliminated In a second state the controlled valve 36 is arranged to be actuated to open, the controlled valve 20 is arranged to be actuated to close and the temperature controlling means can be switched over to a relatively high temperature. The Peltier elements 38 are then flown through by current such that the molecular filter 18 is heated.

Figure 2:
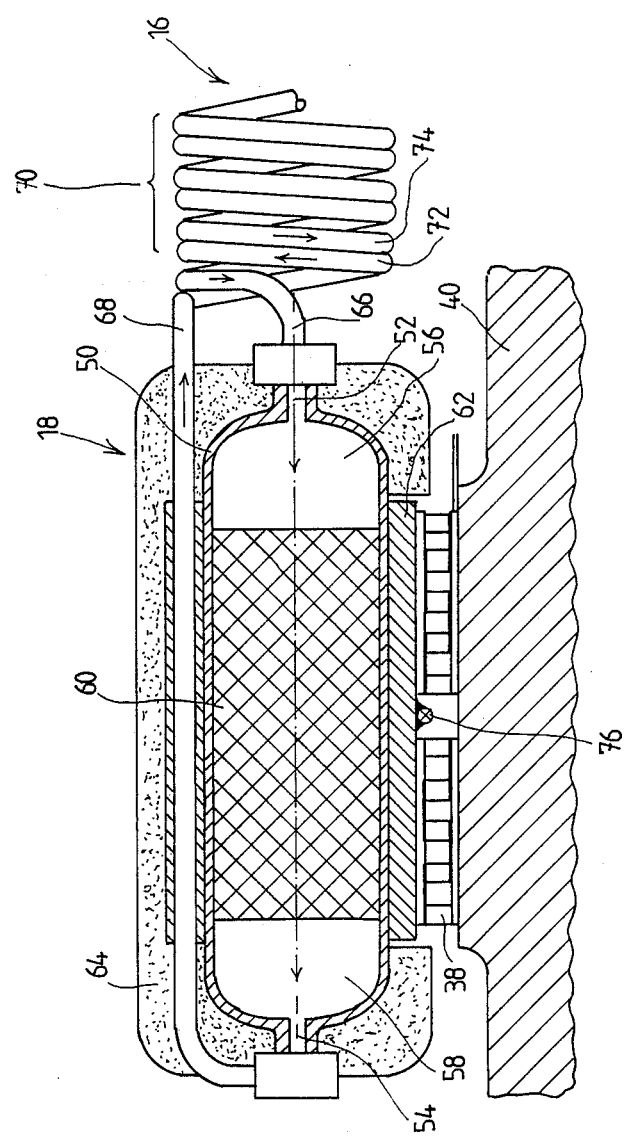
FIG. 2 shows a longitudinal section of the molecular filter with the temperature controlling means in the form of Peltier elements and the pressurized gas conduit.

In FIG. 2 the construction of the molecular filter 18 is illustrated. The molecular filter 18 comprises an elongted housing 50 with an inlet 52 at one end and an outlet 54 at the other end. At said one end an inlet chamber 56 is formed, to which the inlet 52 leads. At said other end an outlet chamber 58 is formed from which the outlet branches off. A filter insert 60 is arranged between inlet chamber 56 and outlet chamber 58 in the housing 50, which filter insert is made of activated carbon, for example. The housing 50 is located in a holding case 62, which ensures good heat conduction and dissipation. The holding case 62 is held through the Peltier elements 38 on the housing of the compressor 10 serving as heat accumulator 40. Outside the area of the Peltier elements 32 the housing 50 and the holding case 62 are surrounded by a heat insulating case 64.

The pressurized gas conduit 16 is connected with a section 66 on the side of the compressor to the inlet 52 and is connected to the outlet 54 with a section 68 leading to the cooling device 22. The section 68 is led through the insulating case 64 and the holding case 62 to the inlet side. The gas flowing into the molecular filter 18 through section 66 is in heat exchange with the gas flowing out of the molecular filter 18 through section 68 by a counterflow heat exchanger 70. The counterflow heat exchanger 70 has tubes 72 for the gas flowing in, which tubes form a portion of the section 66 of the pressurized gas conduit 16 and tubes 74 for the gas flowing out, which tubes form a portion of the section 68 of the pressure conduit 16. The tubes 72 and 74 are in close heat conducting contact with one another and are coiled together. The coiled tubes 72 and 74 act as a helical spring and thus are resilient in axial direction. Thereby the molecular filter 18 is relieved as far as possible of axial forces, which could become effective through the pressurized gas conduit 16. In this way it will be possible that the molecular filter 18, as illustrated, is supported only through the Peltier elements 32 on the heat accumulator 40. In this way the insulation of the molecular filter 18 is improved and any uncontrolled flowing-off and inflow of heat through additional holding elements is avoided.

A temperature sensor 76 is arranged on the molecular filter 18. The temperature sensor 76 applies a temperature signal to the control device 42. Then a temmperature control can occur in that the control device 42 comprises a control system, by which the temperature of the molecular filter 18 is controllable by means of the temperature controlling means, i.e. the Peltier elements 32, to the relatively low temperature in the first state and to the relatively high temperature in the second state. Then operation is at defined, controlled temperatures in adsorption and desorption.

Figure 3:
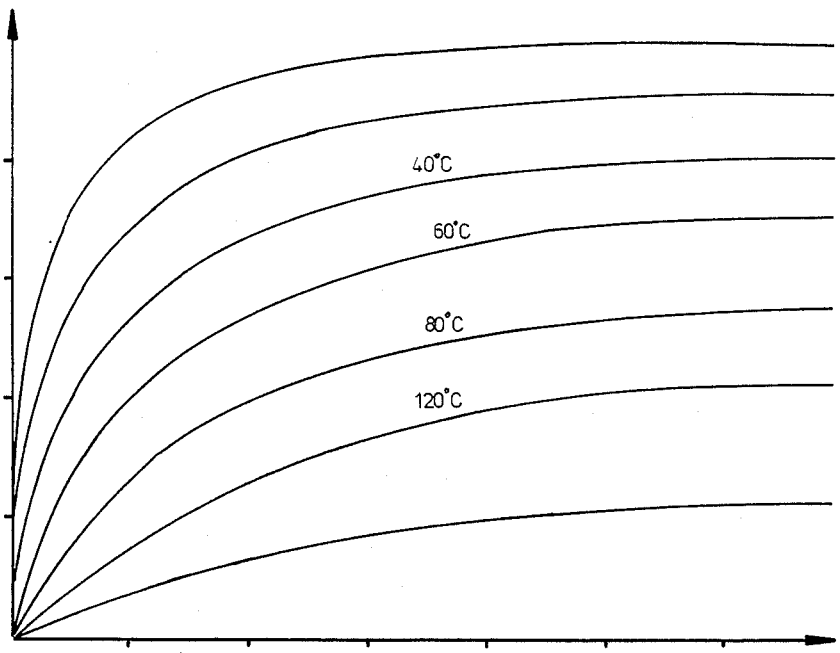
FIG. 3 shows in principle the dependence of the adsorption on the pressure for different temperatures.

The described device operates as follows:

Pressurized gas (pressurized air) is supplied through the pressurized gas conduit 16 to the cooling device 22 by the compressor 10, and thus the detector 24 is cooled very much. Undesirable components of this pressurized gas are filtered by the molecular filter 18 by adsorption. As can be seen from FIG. 3, a certain amount of filter material, like activated carbon can absorb all the more of such elements until it is saturated the higher the pressure and the lower the temperature is. Therefore the molecular filter 18 is cooled by the Peltier elements 38 in normal operation mode. The pressure is the output pressure of the compressor 10 and therefore relatively high. Both inflfuences are favourable for the adsorption. The effect is improved and the change-over to low temperatures is accelerated in that the pressurized gas supplied to the molecular filter 18 is pre-cooled in the counter flow heat exchanger 70 by the pressurized gas flowing out therefrom.

At the same time the storage vessel 30 is "charged" through the branch conduit 28 and the restrictor 32, i.e. charged with pressurized gas under the pressure in the pressurized gas conduit and provided by the compressor 10.

If nevertheless the molecular filter 18 finally approaches the state of saturation, the regeneration of the molecular filter 18 is initiated by the control device. This can occur in fixed time intervals resulting from empirical values. Then the control device 42 changes into the second state. The controlled valve 20 is closed, the controlled valve 36 is opened and the compressor 10 is switched off. At the same time the molecular filter 18 is heated by the Peltier elements 38.

Figure 4:
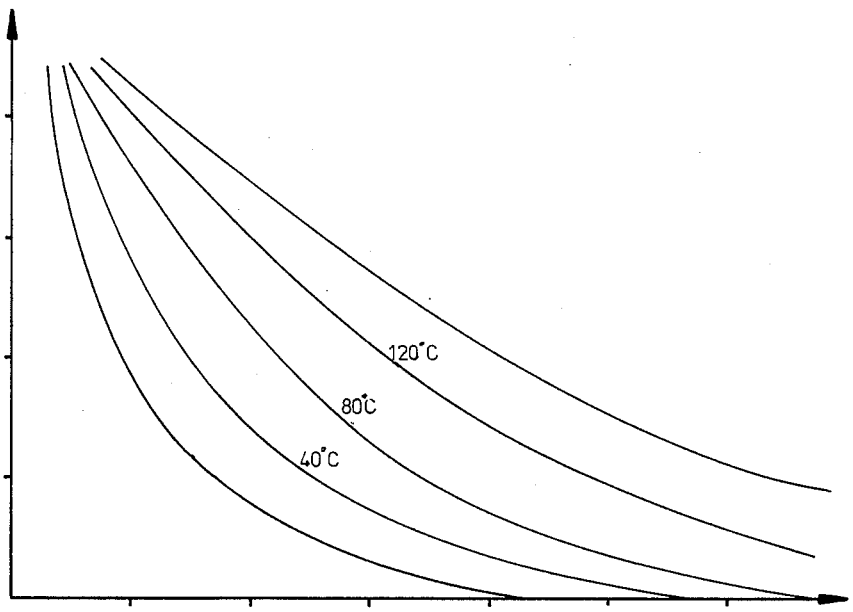
FIG. 4 shows in principle the dependence of the desorption rate on the pressure for different temperatures.

Thereby a flow of pressurized gas flows out of the storage vessel 30 through the restrictor 32 in opposite direction through the molecular filter 18 and through the branch conduit 34 to the outlet. The flow rate can be chosen in a suitable manner by the restrictor 32. A desorption of the gas components adsorped in the molecular filter 18 occurs by this flow, which gas components then are guided to the outlet. As can be seen from FIG. 4 the desorption rate, i.e. the amount of a gas desorped by a certain flow per unit of time, is the higher, the higher the temperature and the lower the pressure is. Just these conditions are accomplished in the second state of the control device: The temperature of the molecular filter 18 is increased. The pressure is decreased by the connection with the outlet through the opened valve 36 and the pressure drop across the restrictor 32. Thereby the desorption and thus the regeneration of the molecular filter 18 can occur in a short time compared with the time of the normal operation. Also here the effect is improved and the change-over accelerated, in that the gas flowing into the molecular filter—now through tube 72—is pre-cooled by the gas flowing out—now through tube 74—. It has become obvious, that the amount of gas stored in the storage vessel 30 is sufficient for the regeneration of the molecular filter 18.

I claim:

1. Device for cooling a detector (24), particularly in an optical seeker, by means of the Joule-Thomson effect by expansion of pressurized gas, comprising
   (a) a compressor (10) connected to a pressurized gas conduit, said compressor capable of taking in and compressing the gas in the pressurized gas conduit (16), said pressurized gas conduit (16) leading to the detector (24) and
   (b) a molecular filter (18) is connected to the pressurized gas conduit (16) downstream of the compressor (10), said molecular filter (18) being capable of adsorbing disturbing elements of the gas,
   (c) a storage vessel (30) is connected to the pressurized gas conduit (16) downstream of the molecular filter (18),
   (d) a controlled valve (36) is connected to the pressurized gas conduit (16) between the compressor (10) and the molecular filter (18), said controlled valve (36) is connected to an outlet,
   (e) temperature controlling means (38) communicate with said molecular filter for varying the temperature of the molecular filter (18) between a relatively low and relatively high value,
   (f) a control device (42) communicates with said controlled valve (36) and said temperature controlling means (38), said control device (42) capable of:
   actuating the controlled valve (36) to close and to switch the temperature controlling means (38) over to the relatively low temperature in a first state and
   actuating the controlled valve (36) to open and to switch the temperature controlling means (38) over to the relatively high temperature in a second state, and
   (g) the control device (42) normally is in the first state and switches into the second state in time intervals.

2. Device as set forth in claim 1, wherein
   (a) a second control valve (20) is arranged along the pressurized gas conduit (16) downstream of the connection (26) of the storage vessel (30) and is connected to said control device (42)
   (b) the second control valve (20) is capable of being actuated by the control device (42) to close in the second state 3. Device as set forth in claim 1, wherein a heat accumulator (40) is connected to the molecular filter by means of the temperature controlling means, the temperature controlling means are Peltier elements (38) and are arranged between the molecular filter (18) and a heat accumulator (40), the Peltier elements are controllable for cooling the molecular filter (18) in the first state.

4. Device as set forth in claim 3, wherein the Peltier elements (38) sare controllable for heating the molecular filter (18) in the second state.

5. Device as set forth in claim 3, wherein the compressor (10) and/or the driving motor (12) include housing means therefor, and wherein the heat accumulator (40) comprises the housing of the operator (10) and/or the driving motor (12).

6. Device as set fort in claim 3, including a counterflow heat exchanger (70) connected to the molecular filter (18) in which the gas flowing into the molecular filter (18) is in heat exchange with the gas flowing out of the molecular filter (18).

7. Device as set forth in claim 6, wherein the counterflow heat exchanger (70) has tubes (72,74) for gas flowing in and out, the tubes being arranged in close conducting contact and said tubes are coiled together.

8. Device as set forth in claim 7, wherein the coiled tubes (72,74) of the counterflow heat exchanger (70) are resilient in the axial direction.

9. Device as set forth in claim 8, wherein the molecular filter (18) is supported on the heat accumulator (40) through the Peltier elements (38) only.

10. Device as set forth in claim 9, wherein
    (a) a temperature sensor (76) is arranged on the molecular filter (18) for applying a temperature signal to the control device (42), and
    (b) wherein the control device (42) includes means for control of the temperature of the molecular filter (18) so that the temperature is adjustable by means of the temperature controlling means (38) from the relatively low temperature in the first state to the relatively high temperature in the second state.

11. Device as set forth in claim 1, wherein the molecular filter (18) is surrounded by a heat insulating case (64) outside the area of the temperature controlling means (38).

12. Device as set forth in claim 1, wherein a restrictor (32) is connected between the storage vessel (30) and the pressurized gas conduit (16).

* * * * *